(12) United States Patent
Yan et al.

(10) Patent No.: US 11,581,524 B2
(45) Date of Patent: Feb. 14, 2023

(54) LITHIUM-SULFUR BATTERY CATHODE, METHOD FOR MAKING THE SAME AND LITHIUM-SULFUR BATTERY USING THE SAME

(71) Applicants: Tsinghua University, Beijing (CN); HON HAI PRECISION INDUSTRY CO., LTD., New Taipei (TW)

(72) Inventors: Ling-Jia Yan, Beijing (CN); Jia-Ping Wang, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 282 days.

(21) Appl. No.: 16/689,285

(22) Filed: Nov. 20, 2019

(65) Prior Publication Data
US 2020/0168893 A1 May 28, 2020

(30) Foreign Application Priority Data
Nov. 27, 2018 (CN) .......................... 201811428254.8

(51) Int. Cl.
*H01M 4/136* (2010.01)
*H01M 4/1397* (2010.01)
(Continued)

(52) U.S. Cl.
CPC ......... *H01M 4/136* (2013.01); *H01M 4/0416* (2013.01); *H01M 4/1397* (2013.01); *H01M 4/5815* (2013.01); *H01M 4/663* (2013.01); *H01M 4/808* (2013.01); *H01M 10/052* (2013.01); *H01M 2004/028* (2013.01)

(58) Field of Classification Search
None
See application file for complete search history.

(56) References Cited

U.S. PATENT DOCUMENTS 9,960,420 B2 5/2018 Sun et al.
10,040,687 B2 8/2018 Luo et al.
(Continued)

FOREIGN PATENT DOCUMENTS

CN 104201352 12/2014
CN 104201352 A * 12/2014
(Continued)

OTHER PUBLICATIONS

Ji et al. A highly ordered nanostructured carbon-sulphur cathode for lithium-sulphur batteries, Nature Materials, vol. 8, Jun. 2009, pp. 500-506. (Year: 2009).*

*Primary Examiner* — Tracy M Dove
(74) *Attorney, Agent, or Firm* — ScienBiziP, P.C.

(57) ABSTRACT

The present disclosure relates to a lithium-sulfur battery cathode. The lithium-sulfur battery cathode comprises a carbon nanotube sponge and a plurality of sulfur nanoparticles. Wherein the carbon nanotube sponge comprises a plurality of micropores. The plurality of sulfur nanoparticles are uniformly distributed in the plurality of micropores. The present disclosure also relates a method for making the lithium-sulfur battery cathode and a lithium-sulfur battery using the lithium-sulfur battery cathode.

14 Claims, 15 Drawing Sheets

(51) Int. Cl.
*H01M 4/66* (2006.01)
*H01M 4/80* (2006.01)
*H01M 4/04* (2006.01)
*H01M 10/052* (2010.01)
*H01M 4/58* (2010.01)
*H01M 4/02* (2006.01)

(56) References Cited

U.S. PATENT DOCUMENTS

| | | | | |
|---|---|---|---|---|
| 2014/0342234 A1* | 11/2014 | Guo | ............... | B82Y 40/00 |
| | | | | 429/231.4 |
| 2015/0017526 A1* | 1/2015 | Zhou | ............... | H01M 4/62 |
| | | | | 429/212 |
| 2016/0190558 A1* | 6/2016 | Niu | ............... | H01M 4/624 |
| | | | | 429/199 |
| 2017/0170511 A1* | 6/2017 | Yu | ............... | H01M 10/052 |
| 2018/0019471 A1* | 1/2018 | Wu | ............... | H01M 4/38 |
| 2018/0062142 A1 | 3/2018 | Kong et al. | | |
| 2018/0287196 A1 | 10/2018 | Luo et al. | | |

FOREIGN PATENT DOCUMENTS

| | | | |
|---|---|---|---|
| CN | 105140461 | | 12/2015 |
| CN | 105329873 | | 2/2016 |
| CN | 107994232 A | * | 5/2018 |
| TW | 201813160 | | 4/2018 |
| TW | 201838235 | | 10/2018 |

\* cited by examiner

LITHIUM-SULFUR BATTERY CATHODE, METHOD FOR MAKING THE SAME AND LITHIUM-SULFUR BATTERY USING THE SAME

CROSS-REFERENCE TO RELATED APPLICATIONS

This application claims all benefits accruing under 35 U.S.C. § 119 from China Patent Application No. 201811428254.8, filed on Nov. 27, 2018, in the China National Intellectual Property Administration, the contents of which are hereby incorporated by reference.

FIELD

The present disclosure relates to a lithium-sulfur battery cathode, a method for making the lithium-sulfur battery cathode and a lithium-sulfur battery using the lithium-sulfur battery cathode.

BACKGROUND

Demands for new energy sources are increasing, and development in new secondary batteries with high energy density and high specific capacity is progressing rapidly. A lithium-sulfur (Li—S) battery has been widely considered as one of the most promising candidates due to its high theoretical energy density (2600 W h kg$^{-1}$) and specific capacity (1675 mA h g$^{-1}$). Furthermore, elemental sulfur has advantages of natural abundance, environmental benignity, and low lost. However, commercial applications of the Li—S battery are still hampered by the following challenges. Firstly, volume variations of sulfur can be as high as 80% during a lithiation/delithiation process. Such variations can easily damage an overall structure of the battery, thereby affecting an overall performance of the battery. Secondly, an insulating nature of elemental sulfur and its discharge products (Li$_2$S$_x$, x=1-8) results in the fairly low electrical conductivity of the sulfur cathode. Shuttle effects, caused by a dissolution and migration of soluble intermediate polysulfides, can cause severe active material loss and eventually fast capacity decay of the Li—S battery.

Several approaches have been put forward to solve the challenges discussed above, including unique nanostructured sulfur cathodes, functional interlayers or separators, modified electrolyte, and novel lithium anode design. All these methods show enhanced electrochemical performances to some extent. Most of the challenges of the Li—S battery are related to the sulfur cathode. Optimizing the sulfur cathode seems to be the key to an efficient and effective Li—S battery.

What is needed, therefore, is to provide a battery with an improved cathode.

BRIEF DESCRIPTION OF THE DRAWINGS

Many aspects of the exemplary embodiments can be better understood with reference to the following drawings. The components in the drawings are not necessarily drawn to scale, the emphasis instead being placed upon clearly illustrating the principles of the exemplary embodiments. Moreover, in the drawings, like reference numerals designate corresponding parts throughout the several views.

DETAILED DESCRIPTION

Figure 1A:
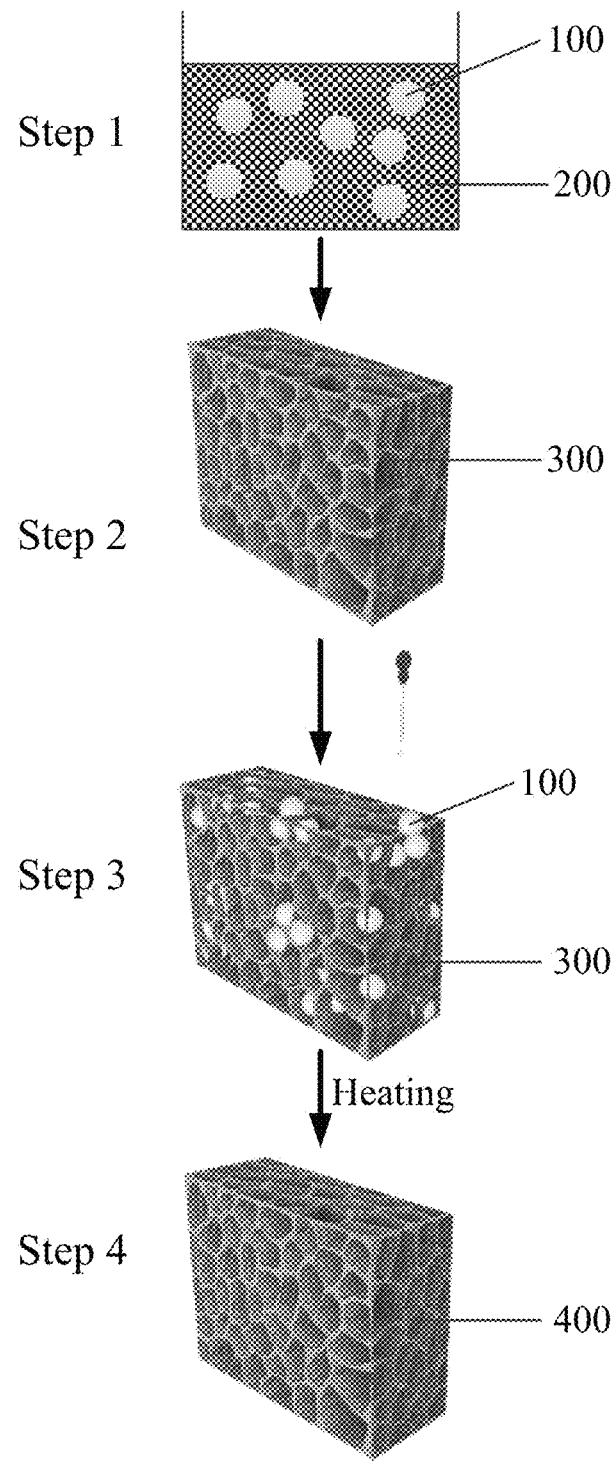
FIG. 1a is a flow chart of a method for making a Li—S battery cathode according to one embodiment.

The disclosure is illustrated by way of embodiments and not by way of limitation in the figures of the accompanying drawings in which like references indicate similar elements.

It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to illustrate details and features of the present disclosure better.

Several definitions that apply throughout this disclosure will now be presented.

The term "substantially" is defined to be essentially conforming to the particular dimension, shape, or other feature which is described, such that the component need not be exactly or strictly conforming to such a feature. The term "include," when utilized, means "include, but not necessarily limited to"; it specifically indicates open-ended inclusion or membership in the so-described combination, group, series, and the like.

Referring to FIG. 1a, a method for making a Li—S battery cathode 400 comprises the following steps:

step 1, dispersing sulfur particles 100 in a solvent 200 to obtain a sulfur dispersion;

step 2, providing a carbon nanotube sponge 300;

step 3, infiltrating the carbon nanotube sponge 300 with the sulfur dispersion; and step 4, heating the carbon nanotube sponge 300 and the sulfur dispersion distributed in the carbon nanotube sponge 300 to obtain the Li—S battery cathode 400.

The step 1~4 are described in detail as followings.

In the step 1, the sulfur particles 100 are dispersed into a solvent 200, and a sulfur dispersion can be obtained.

The solvent 200 is used to dissolve the sulfur particles 100. The solvent 200 can be selected from organic solvents such as methanol, ethanol, and acetone. The sulfur particles 100 are dispersed in the solvent 200 via ultra sonication to obtain the sulfur dispersion. In one embodiment, the solvent 200 is ethanol.

A concentration of the sulfur particles 100 in the solvent 200 is not limited, and it can be understood that the larger the concentration of the sulfur, the more the sulfur loading in the battery cathode.

In the step 2, a carbon nanotube sponge 300 is provided.

Figure 1B:
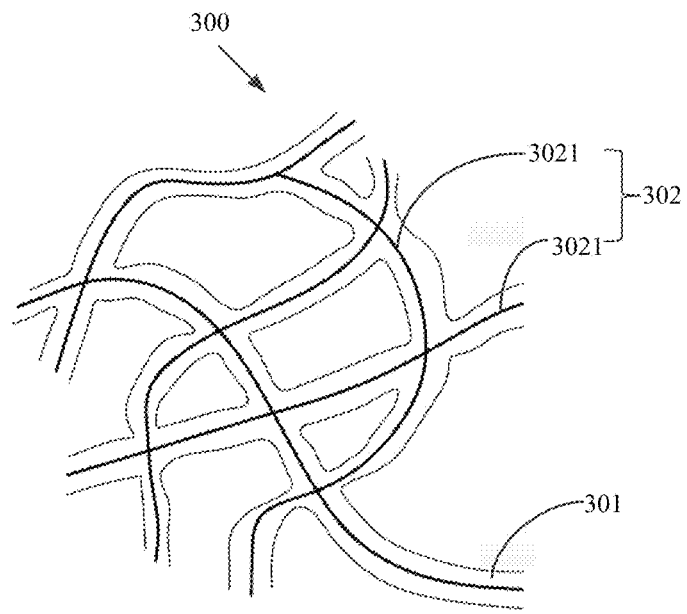
FIG. 1b is a structure schematic of a CNT sponge used in one embodiment.

Referring to FIG. 1b, the carbon nanotube sponge 300 consists of a carbon nanotube net structure 302 and a carbon layer 301. The carbon nanotube net structure 302 comprises a plurality of carbon nanotubes 3021 entangled with each other, thereby forming a plurality of micropores in the carbon nanotube net structure 302. The carbon layer 301 is uniformly coated on a surface of each of the plurality of carbon nanotubes 3021. The carbon layer 301 is unbroken at junctions between the plurality of carbon nanotubes 3021, and the plurality of carbon nanotubes 3021 are affixed together at the junctions by the carbon layer 301. A mass ratio of the carbon layer 301 and the carbon nanotube net structure 302 ranges from approximately 0.01:1 to approximately 8:1.

A method for making the carbon nanotube sponge 300 comprises the following steps:

step 21: providing a carbon nanotube source, the carbon nanotube source being obtained from a carbon nanotube array;

step 22: adding the carbon nanotube source into an organic solvent, and ultrasonically agitating the organic solvent to form a flocculent structure;

step 23, washing the flocculent structure by water;

step 24, freeze-drying the flocculent structure under a vacuum condition to form a carbon nanotube sponge preform;

step 25, depositing a carbon layer on the carbon nanotube sponge preform to form the carbon nanotube sponge 300.

In step 21, the carbon nanotube source can be made of carbon nanotubes. The carbon nanotubes can be single-walled carbon nanotubes, double-walled carbon nanotubes, or multi-walled carbon nanotubes. A diameter of the carbon nanotube can be in a range from approximately 20 nanometers to approximately 30 nanometers. A length of the carbon nanotubes can be longer than 100 micrometers. In one embodiment, the length of the carbon nanotubes is longer than 300 micrometers. The carbon nanotubes can be pure, meaning there are few or no impurities adhered on surface of the carbon nanotubes. A method for making the carbon nanotube source can comprise providing a carbon nanotube array, wherein the carbon nanotube array can be formed on a substrate, and scratching off the carbon nanotube array from the substrate to form the carbon nanotube source. Since the carbon nanotube source is directly obtained from the carbon nanotube array, the carbon nanotube sponge stronger prepared by the carbon nanotube source has better strength. In one embodiment, the carbon nanotube array is a super-aligned carbon nanotube array. A height of the super-aligned carbon nanotube array is usually greater than or equal to 300 μm. The super-aligned carbon nanotube array is essentially free of impurities such as carbonaceous or residual catalyst particles.

In step 22, the organic solvent has excellent wettability to the carbon nanotubes. The organic solvent can be ethanol, methanol, acetone, isopropanol, dichloromethane, chloroform, or the like. A mass ratio between the carbon nanotube source and the organic solvent can be selected according to actual need. In one embodiment, the organic solvent is ethanol.

During a process of ultrasonically agitating the organic solvent and the carbon nanotube source, a power of ultrasonic waves can be in a range from approximately 300 W to approximately 1500 W. In one embodiments, the power is in a range from approximately 500 W to approximately 1200 W. A duration of the process can range from approximately 10 minutes to approximately 60 minutes. After the ultrasonic agitation, the carbon nanotubes of the carbon nanotube source are uniformly distributed in the organic solvent, thus the flocculent structure is formed. Since the carbon nanotube source is scratched from the super aligned carbon nanotube array, the process of ultrasonic agitation does not separate the carbon nanotubes, and the carbon nanotubes are entangled with each other to form the flocculent structure. The flocculent structure comprises a plurality of pores. Since the organic solvent has excellent wettability to the carbon nanotubes, the carbon nanotube source can be uniformly dispersed in the organic solvent.

In step 23, a freezing point of the organic solvent is lower than −100 Celsius, which is not appropriate for the subsequent freeze-drying. However, after a process of washing the flocculent structure by water, the plurality of pores of the flocculent structure are filled with water, which is suitable for the subsequent freeze-drying.

In step 24, a process of freeze-drying the flocculent structure under a vacuum condition comprises steps of: placing the flocculent structure into a freeze dryer, and rapidly cooling the flocculent structure to a temperature below −40 Celsius; and evacuating the freeze dryer and increasing the temperature of the freeze dryer to a room temperature in gradual stages, wherein a drying time at different stages ranges from approximately 1 hour to approximately 10 hours.

The process of freeze-drying the flocculent structure under a vacuum condition can prevent the carbon nanotube sponge preform from collapsing, thus the carbon nanotube sponge formed in the subsequent step can be fluffy and comprises a plurality mesopores. A density of the carbon nanotube sponge preform ranges from approximately 0.5 $mg/cm^3$ to approximately 100 $mg/cm^3$. The density of the carbon nanotube sponge preform can be changed according to practice.

In step 25, a method of depositing the carbon layer on the carbon nanotube sponge preform is not limited, and can be chemical vapor deposition, electrochemical deposition, or any other appropriate method. The chemical vapor deposition comprises steps: introducing a carbon source gas to a furnace; heating the furnace to a temperature in the range from approximately 700 Celsius to approximately 1230 Celsius under a protective gas, wherein the carbon source gas is decomposed and then is deposited on the carbon nanotube sponge preform to form the carbon layer. The carbon source gas is deposited on the surface of each of the plurality of carbon nanotubes through the plurality of mesopores of the carbon nanotube sponge preform. A time of the process of depositing the carbon layer on the carbon nanotube sponge preform ranges from approximately 1 minute to approximately 240 minutes. A thickness of the carbon layer ranges from approximately 2 nanometers to approximately 100 nanometers. The carbon layer can be made of crystalline carbon, amorphous carbon, and/or combination thereof.

In the step 3, the carbon nanotube sponge 300 is infiltrated with the sulfur dispersion.

Since the carbon nanotube sponge 300 characterize in great adsorption capacity, if the carbon nanotube sponge 300 is directly immersed in the sulfur dispersion, it would adsorb much sulfur dispersion in a short time and then rupture. In one embodiment, the sulfur dispersion is added to the carbon nanotube sponge 300. The sulfur dispersion can be dropped on the surface of the carbon nanotube sponge 300 by using a dropper pipette, and the sulfur dispersion flows along the micropores in the carbon nanotube sponge 300 to infiltrate the entire carbon nanotube sponge 300.

In the step 4, the carbon nanotube sponge 300 and the sulfur dispersion distributed in the carbon nanotube sponge 300 are heated, and a Li—S battery cathode 400 is obtained.

Figure 1C:
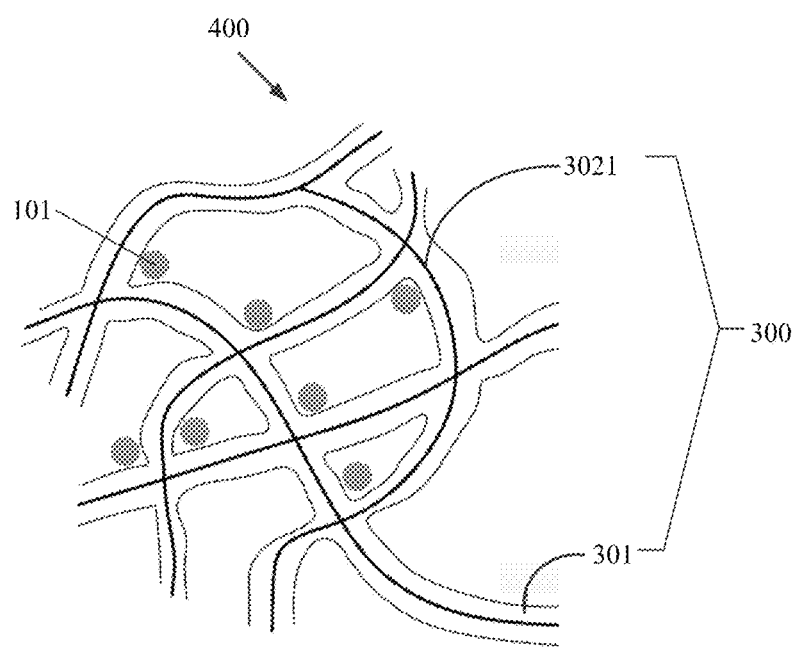
FIG. 1c is a structure schematic of the Li—S battery cathode according to one embodiment.

The battery electrode can be dried by heating. The diameters of the sulfur particles 100 in the dispersion are large, and generally greater than 50 nm. The sulfur particles 100 in the carbon nanotube sponge 300 can melt through heating and shrink into sulfur nanoparticles 101 with smaller size after cooling, as shown in FIG. 1c. The sulfur nanoparticles 101 cannot easily agglomerate and can uniformly distributed in the carbon nanotube sponge 300. In one embodiment, the carbon nanotube sponge 300 infiltrated by the sulfur dispersion is heated at a temperature ranging from approximately 120 to approximately 200° C. for 1 to 20 h. In other embodiment, the heating temperature is 150° C., and the heating time is 12 h. Thus, a composite sponge comprising sulfur and carbon nanotube can be obtained, wherein the composite sponge is called as S/CNT sponge. The S/CNT sponge is a free-standing structure and can be used as the Li—S battery cathode directly.

The method for preparing the Li—S battery cathode directly uses the sulfur dispersion liquid to infiltrate the carbon nanotube sponge. The method is simple and easy and has a low cost.

Referring to FIG. 1c, the Li—S battery cathode 400 comprises a carbon nanotube sponge 300 and a plurality of sulfur nanoparticles 101. The carbon nanotube sponge 300 comprises a plurality of micropores. The plurality of sulfur nanoparticles 101 are uniformly distributed in the plurality of micropores. The carbon nanotube sponge 300 is essentially free of sulfur nanoparticle agglomerates.

The carbon nanotube sponge 300 comprises a plurality of carbon nanotubes 3021. The plurality of carbon nanotubes 3021 are entangled with each other to form a three-dimensional (3D) honeycomb-like structure comprising a plurality of micropores. The micropores are distributed between adjacent ones of the plurality of carbon nanotubes 3021 or among carbon nanotube bundles surrounded by carbon nanotubes 3021. A diameter of each of the plurality of micropores is greater than or equal to 2 nanometers (nm).

In some embodiments, the plurality of carbon nanotubes 3021 of the carbon nanotube sponge 300 can be pure, meaning there is few impurities such as amorphous carbon adhered on a surface of the carbon nanotubes 3021. No functional group such as hydroxyl group is bonded with the carbon nanotubes 3021. The carbon nanotubes 3021 can be single-walled carbon nanotubes, double-walled carbon nanotubes, or multi-walled carbon nanotubes. A diameter of each of the plurality of carbon nanotubes 3021 can be in a range from approximately 1 nanometer to approximately 200 nanometers. The carbon nanotube sponge 300 can be composed only of carbon nanotubes 3021. In other embodiments, the carbon nanotube sponge 300 comprises a carbon layer 301. The carbon layer 301 is uniformly coated on the surface of each of the plurality of carbon nanotubes 3021. The carbon layer 301 is unbroken at junctions between the plurality of carbon nanotubes 3021, and the plurality of carbon nanotubes 3021 are affixed together at the junctions by the carbon layer 301. A mass ratio between the carbon layer 301 and the carbon nanotubes 3021 ranges from approximately 0.01:1 to approximately 8:1. When the mass ratio between the carbon layer 301 and the carbon nanotubes 3021 is too small, e.g., smaller than 0.01:1, the carbon layer 301 cannot be uniformly coated on the surface of each of the plurality of carbon nanotubes 3021. When the mass ratio between the carbon layer 301 and the carbon nanotubes 3021 is too great, e.g., greater than 8:1, the carbon layer 301 can easily form blocks between the carbon nanotubes 3021, affecting a distribution of the sulfur nanoparticles 101 in the carbon nanotube sponge 300. In one embodiment, the mass ratio between the carbon layer 301 and the carbon nanotubes 3021 ranges from approximately 0.05:1 to approximately 2:1. A thickness of the carbon layer 301 ranges from approximately 2 nanometers to approximately 100 nanometers. The carbon layer 301 can be crystalline carbon, amorphous carbon, and/or combination thereof. A specific surface area of the carbon nanotube sponge 300 can be larger than 200 $m^2/g$. Since the carbon nanotubes 3021 in the carbon nanotube sponge 300 are intertwined with each other, and the carbon layer 301 is continuous at intersections of adjacent carbon nanotubes, the carbon nanotube sponge 300 has good mechanical property and recovery property. The carbon nanotube sponge 300 is a complete elastomer, that is, the carbon nanotube sponge 300 can be restored to its original shape after being compressed.

Figure 8:
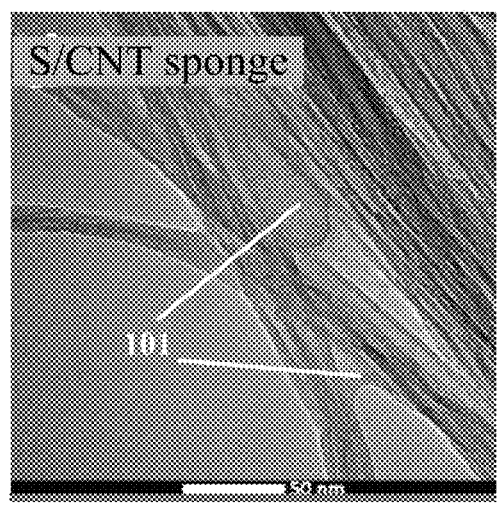
FIG. 8 is a TEM image of a carbon nanotube bundle of the S/CNT sponge.

The sulfur nanoparticles 101 are uniformly distributed in the plurality of micropores of the carbon nanotube sponge 300, that is, the sulfur nanoparticles 101 are distributed between adjacent ones of the plurality of carbon nanotubes 3021 or among carbon nanotube bundles surrounded by carbon nanotubes 3021. Since the sulfur nanoparticles 101 are not coated on the surfaces of the carbon nanotubes 3021 of the carbon nanotube sponge 300, the polysulfide, the discharge intermediate of sulfur, can be easily bound and adsorbed by the carbon nanotube sponge 300, hence, the shuttle effect can be avoided. The diameter of each of the plurality of sulfur nanoparticles 101 is less than or equal to 50 nm, as shown in FIG. 8 or in FIG. 11. The diameter of each of the plurality of sulfur nanoparticles 101 is much smaller than that of the micropores in the carbon nanotube sponge 300, so the micropores of the carbon nanotube sponge 300 are not filled by the sulfur nanoparticles 101. Therefore, the Li—S battery cathode 400 provided by the present disclosure is also a honeycomb-like structure, and comprises a large number of microholes, which can be fully illustrated in FIG. 2. So, the electrolyte can easily penetrate into the Li—S battery cathode 400 through the microholes, and can fully contact active materials in the Li—S battery cathode 400, which can improve the utilization ratio of active materials. In one embodiment, an areal density (sulfur loading per unit area) of sulfur in the Li—S battery cathode 400 is greater than or equal to 2 milligrams per square centimeter (mg·cm$^{-2}$), and a mass content of sulfur in the Li—S battery cathode 400 ranges from approximately 40% to approximately 60%.

The Li—S battery cathode provided in the disclosure comprises the following characters: Firstly, the carbon nanotube sponge comprises a plurality of micropores, the sulfur nanoparticles are evenly distributed in the plurality of micropores, and the diameter of the sulfur nanoparticles is much smaller than that of the micropores. Therefore, the volume change of sulfur can be alleviated effectively during a charge/discharge progress, and the overall structure of the battery cathode can be maintained. Secondly, the carbon nanotube sponge provides a conductive network for electron conduction. Thus, the conductivity of the electrode can be increased greatly. Thirdly, the carbon nanotube sponge can bind and adsorb the polysulfide, thereby the polysulfide is prevented from being dissolved in the electrolyte, and an electrochemical performance of the Li—S battery can be effectively improved. Fourthly, since the carbon nanotube sponge is a free-standing structure, has good electrical conductivity, and has a large specific surface area, the Li—S battery cathode need no current collector, no conductive agent and no binder, and a weight of the Li—S battery cathode can be greatly reduced. Fifthly, the carbon nanotube sponge is thick to some extend and comprises a plurality of pores, so the sulfur loading can be high. Sixthly, a porous structure of the carbon nanotube sponge is beneficial to a penetration of electrolyte and the full contact between the electrolyte and the active material sulfur, thereby the utilization rate of the active material can be improved.

A Li—S battery is further provided in one embodiment. Wherein, the Li—S battery comprises an anode, a cathode, a separator and an electrolyte. The cathode of the Li—S battery uses the Li—S battery cathode mentioned above.

In order to further illustrate a performance of the Li—S battery cathode and the Li—S battery, a comparative embodiment is utilized in the present disclosure. The comparative embodiment uses a S/CNT film of the prior art as its cathode, and a method for preparing the S/CNT film is described below.

Embodiment 1

Preparing a S/CNT sponge cathode: 20 mg sulfur particles are provided and ultrasonically dispersed in 50 mL ethanol to obtain a sulfur dispersion. Then 3 mL sulfur dispersion is added into a carbon nanotube sponge by a dropper, wherein a dimension of the carbon nanotube sponge is 1 cm×1 cm×1 cm. Finally, the carbon nanotube sponge impregnated with the sulfur dispersion is heated at 155° C. for 12 hours, thereby the S/CNT sponge cathode is obtained. The S/CNT sponge cathode is free-standing and well conductive, so no extra current collectors, conductive agents or binders are needed.

Preparing a S/CNT sponge battery: a coin-type (CR 2016) half-cell is assembled in an Ar-filled glove box. The S/CNT sponge cathode is treated as a working electrode and a lithium foil is worked as a reference electrode. A polypropylene film is employed as a separator. An electrolyte is 1M LiTFSI and 0.2M LiNO$_3$ dissolved in a 1:1 weight ratio of EC:DEC.

Comparative Embodiment 1

Preparing a S/CNT film cathode: sulfur powder and carbon nanotubes from a super-aligned carbon nanotube array are simultaneously dispersed in water/ethanol solution through ultra sonication for 30 min. Then the S/CNT film is obtained by vacuum filtration and dried at 50° C. Finally, the S/CNT film is sealed in steel vessels at 155° C. for 12 h.

Preparing a S/CNT film battery: a coin-type (CR 2016) half-cell is assembled in an Ar-filled glove box. The S/CNT film cathode is treated as a working electrode and a lithium foil is worked as a reference electrode. A polypropylene film (Celgard 2400) is employed as a separator. An electrolyte is 1M LiTFSI and 0.2M LiNO$_3$ dissolved in a 1:1 weight ratio of EC:DEC.

A series of characterizations and tests for the two electrodes are shown below.

Figure 2:
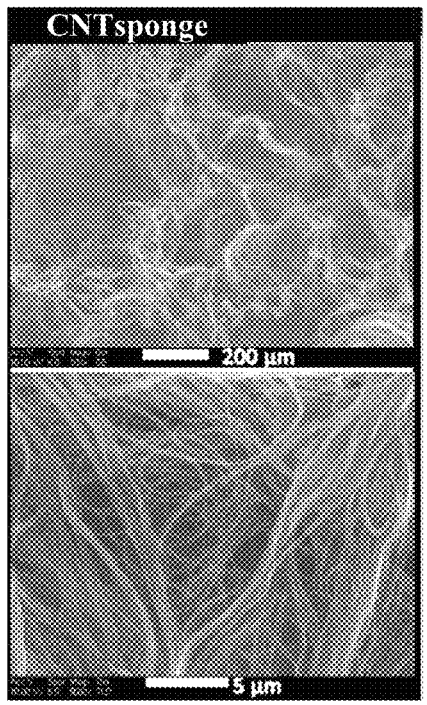
FIG. 2 are scanning electron microscope (SEM) images of the CNT sponge under two different magnifications.
Figure 3:
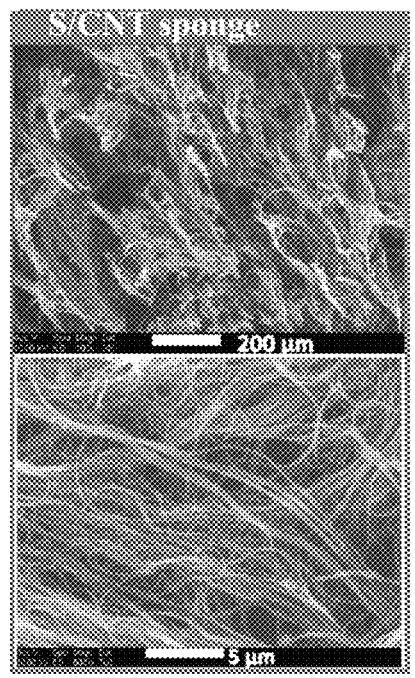
FIG. 3 are SEM images of a S/CNT sponge under two different magnifications.
Figure 4:
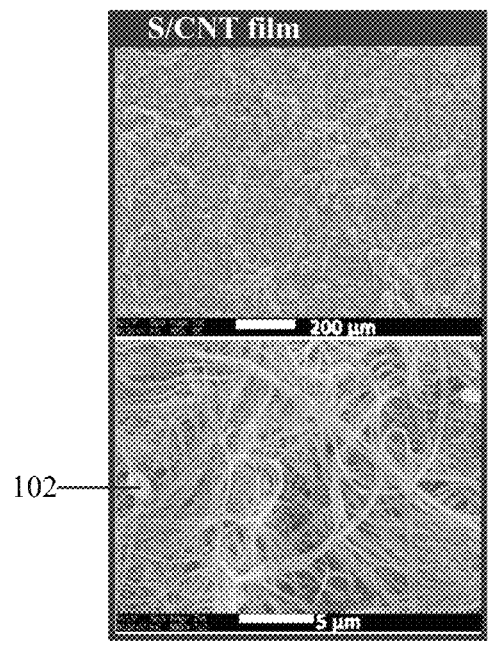
FIG. 4 are SEM images of a S/CNT film under two different magnifications. (Prior art)

A morphological comparison between the S/CNT sponge and the S/CNT film is shown in FIG. 2 to FIG. 13. Referring to FIG. 2, the CNT sponge presents a 3D honeycomb-like structure, wherein micropores in diameters of tens to hundreds of micrometers can be obviously seen in the CNT sponge. Referring to FIG. 3, inner channels of the S/CNT sponge are open and interconnected. The S/CNT sponge comprises a plurality of microholes. According to FIG. 3, the 3D honeycomb-like structure of the CNT sponge has no deformation after sulfur loading in the CNT sponge. In addition, from the high magnification SEM image of the S/CNT sponge, there are no observable sulfur nanoparticles on the surfaces of carbon nanotubes, which is an evidence that the 3D honeycomb-like structure can be beneficial to a homogenous dispersion of sulfur particles and can effectively avoid agglomerations of sulfur particles. Referring to FIG. 4, the S/CNT film is a typical two-dimensional film with less porosity compared to the 3D CNT sponge. As a result, small amount of sulfur nanoparticles still cannot uniformly load on the network intertwined with the carbon nanotubes even after the heat treatment. Then the sulfur nanoparticle agglomerates 102 on the surface of the S/CNT film would lead to the increase of the electrode's internal resistance and further polarization.

Figure 5:
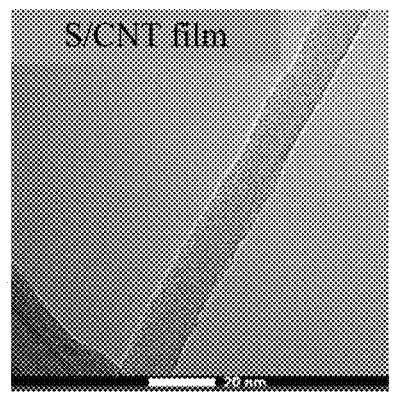
FIG. 5 is a transmission electron microscope (TEM) image of a single carbon nanotube of the S/CNT film. (Prior Art)
Figure 6:
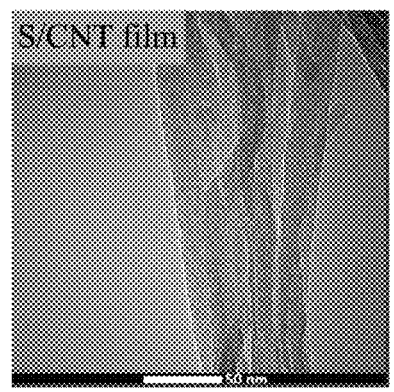
FIG. 6 is a TEM image of a carbon nanotube bundle of the S/CNT film. (Prior Art)
Figure 7:
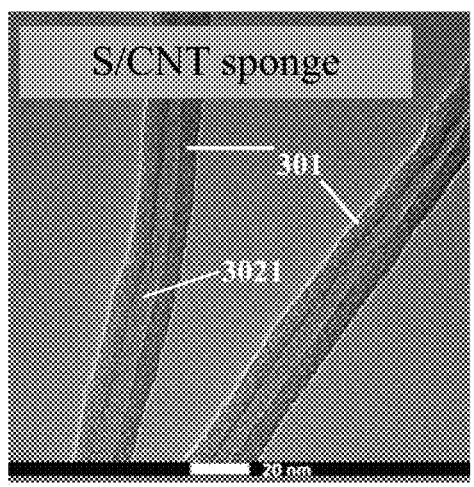
FIG. 7 is a TEM image of a single carbon nanotube of the S/CNT sponge.

Referring to FIG. 5 and FIG. 6, a tube wall of a single carbon nanotube in the S/CNT film can not be observed for the poor electrical conductivity of the sulfur particles. So it can be inferred that surfaces of carbon nanotubes are totally wrapped by sulfur nanoparticles. In contrast, the morphologies of carbon nanotubes are very different for the S/CNT sponge in FIG. 7 and FIG. 8. The carbon layer 301 and the tube wall of the carbon nanotube 3021 in the S/CNT sponge can be clearly seen in FIG. 7, indicating that the tube wall of the single carbon nanotube is essentially not coated by sulfur nanoparticles. The sulfur nanoparticles cannot get inside of a carbon nanotube because of the large aspect ratio of the carbon nanotube. As shown in FIG. 8, the sulfur nanoparticles 101 are distributed among the carbon nanotube bundles or between the neighboring carbon nanotubes.

Figure 9:
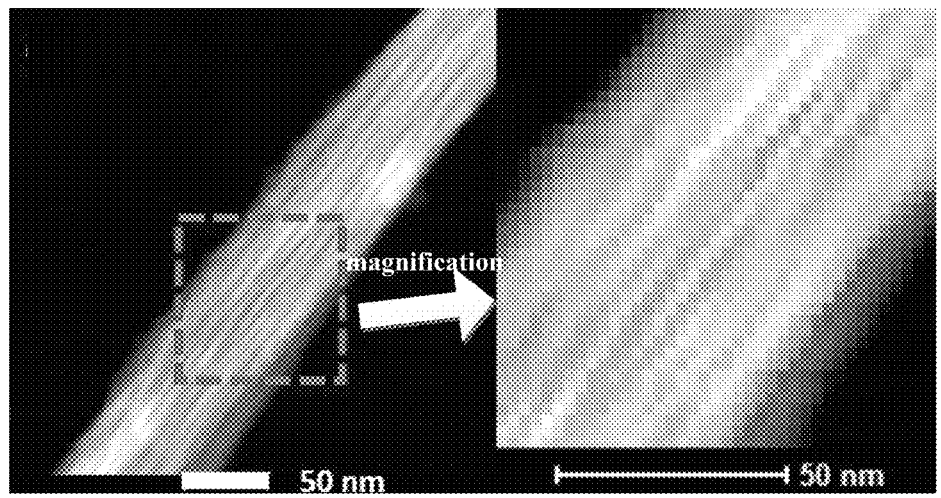
FIG. 9 are high-angle annular dark-field scanning TEM (HAADF-STEM) images of the S/CNT sponge.
Figure 10:
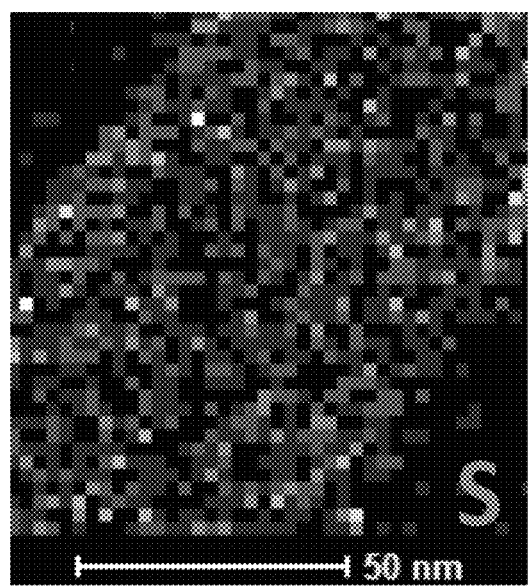
FIG. 10 is a sulfur element mapping image of the S/CNT sponge.

Referring to FIG. 9, sulfur nanoparticles in the carbon nanotube bundles can not observed, which indicates that sulfur nanoparticles are not distributed on surface of the carbon nanotube bundles. Referring to FIG. 10, the elemental map of sulfur indicates that sulfur nanoparticles are uniformly distributed among the carbon nanotube bundles.

Figure 11:
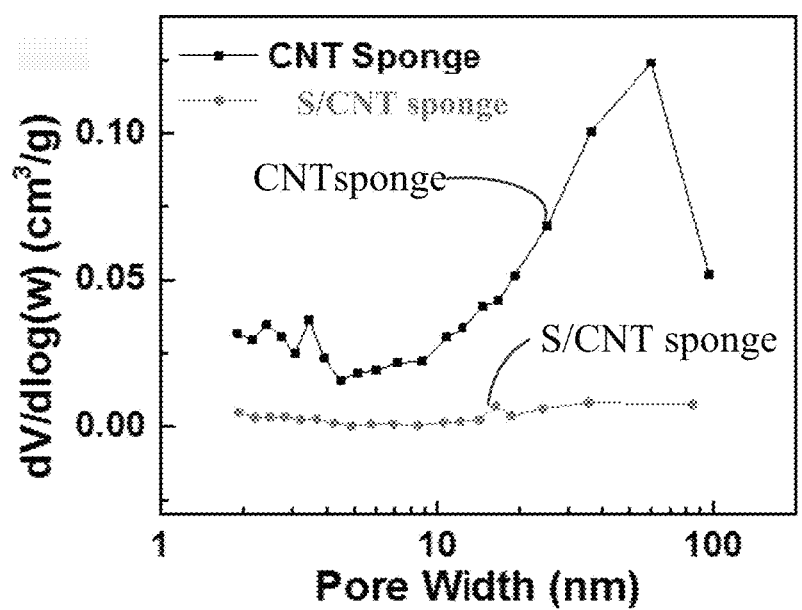
FIG. 11 are pore size distribution diagrams of the CNT sponge and the S/CNT sponge.

Nitrogen absorption/desorption experiments are performed to identify the pore size characteristics of the CNT sponge and the S/CNT sponge, and the pore size distribution is shown in FIG. 11. Referring to FIG. 11, the diagram of CNT sponge exhibits two small mild and one large sharp peaks at 2.42 nm, 3.44 nm, and 59.90 nm, corresponding to the macropores between neighboring tubes (2.42 nm and 3.44 nm) and among bundles (59.90 nm). Moreover, after the CNT sponge is loaded with the sulfur nanoparticles, the above mentioned three peaks almost disappear, further proving the deposition of sulfur in the macropores of the CNT sponge.

Figure 12:
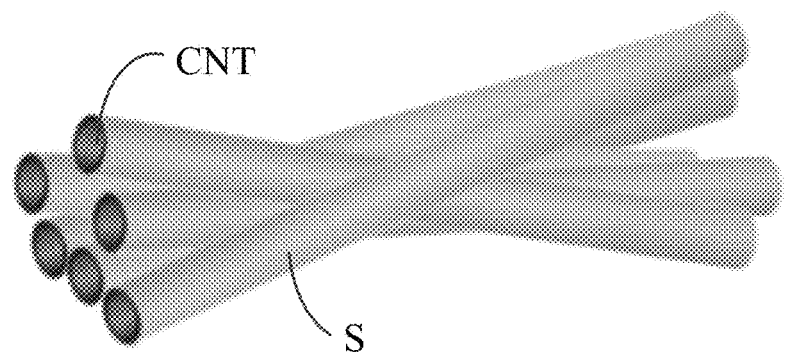
FIG. 12 is a distribution schematic diagram of sulfur nanoparticles in the S/CNT film. (Prior art)
Figure 13:
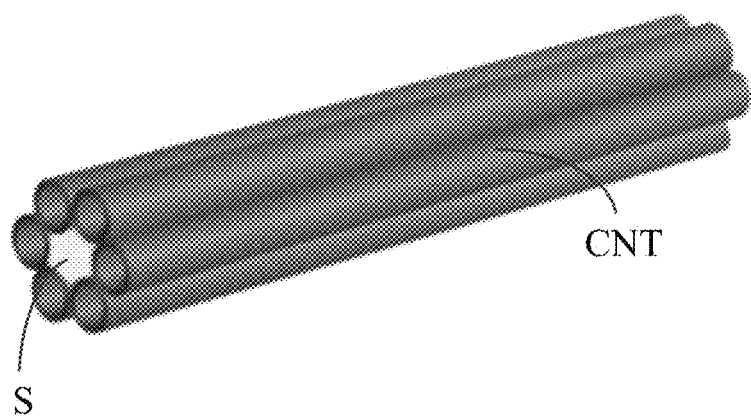
FIG. 13 is a distribution schematic diagram of sulfur nanoparticles in the S/CNT sponge.

Referring to FIG. 12, the sulfur nanoparticles in the S/CNT film are loaded on the surface of carbon nanotubes and is open to the electrolyte. Therefore, the discharge products of sulfur-polysulfides are easy to dissolve in the electrolyte and migrates as the electrolyte moves. It is difficult to load more sulfur nanoparticles in this kind of sulfur deposition. Thus the areal density of sulfur in the S/CNT film is confined to a certain degree and small. Referring to FIG. 13, the micropores in the CNT sponge provide plenty of deposition sites for sulfur nanoparticles. The deposition sites can effectively prevent the dissolution of polysulfides and the loss of active materials. In addition, the CNT sponge exhibits strong adsorption capacity, so the polysulfides dissolved outside the CNT bundles can be well adsorbed by the 3D sponge structure. With the double restraint for polysulfides, the S/CNT sponge can effectively improve a cycling stability and a Coulombic efficiency of Li—S battery.

Figure 14:
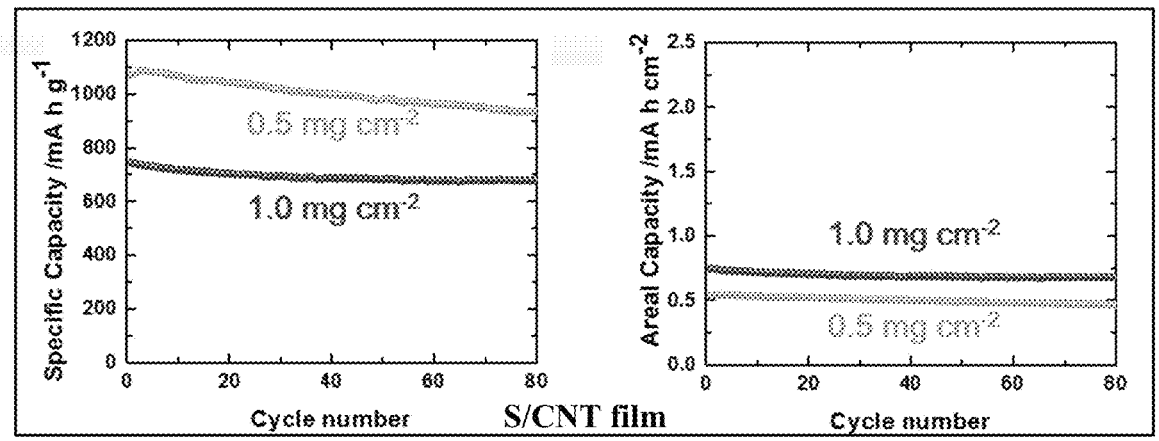
FIG. 14 are diagrams of cyclic performance of the S/CNT film cathode tested at 1 C. (Prior art)
Figure 15:
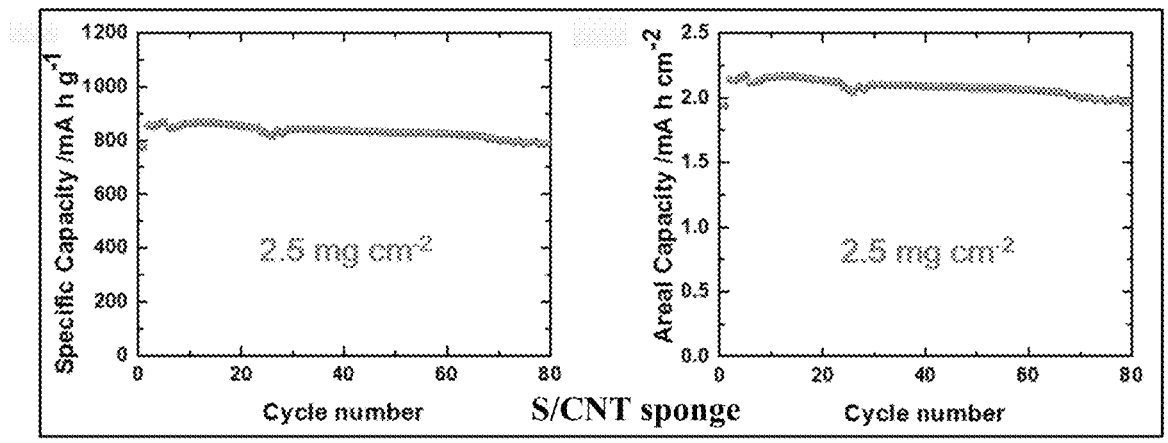
FIG. 15 are diagrams of cyclic performance of the S/CNT sponge cathode tested at 1 C.

A specific capacity cycle performance comparison between the S/CNT sponge electrode and the S/CNT film electrode is shown in FIG. 14~FIG. 15. As is shown in FIG. 14, the S/CNT film with areal density of 0.5 mg cm$^{-2}$ and 1.0 mg cm$^{-2}$ are chosen. As is shown in FIG. 15, the S/CNT sponge with areal density of 2.5 mg cm$^{-2}$ is chosen. The two S/CNT films and the S/CNT sponge all possess the same sulfur ratio of 50 wt. %. Referring to FIG. 14 and FIG. 15, a capacity retention of the S/CNT sponge electrode is higher than that of the two S/CNT film electrodes after 80 cycles, showing the excellent cycling stability of the S/CNT sponge electrode. Although the specific capacity of the S/CNT sponge electrode is slightly inferior to that of the two S/CNT film electrodes, an areal capacity of the S/CNT sponge electrode is nearly three times larger than that of the two S/CNT film electrodes.

In the test experiments described below, the areal density of the S/CNT film used is 1.0 mg cm$^{-2}$.

Figure 16:
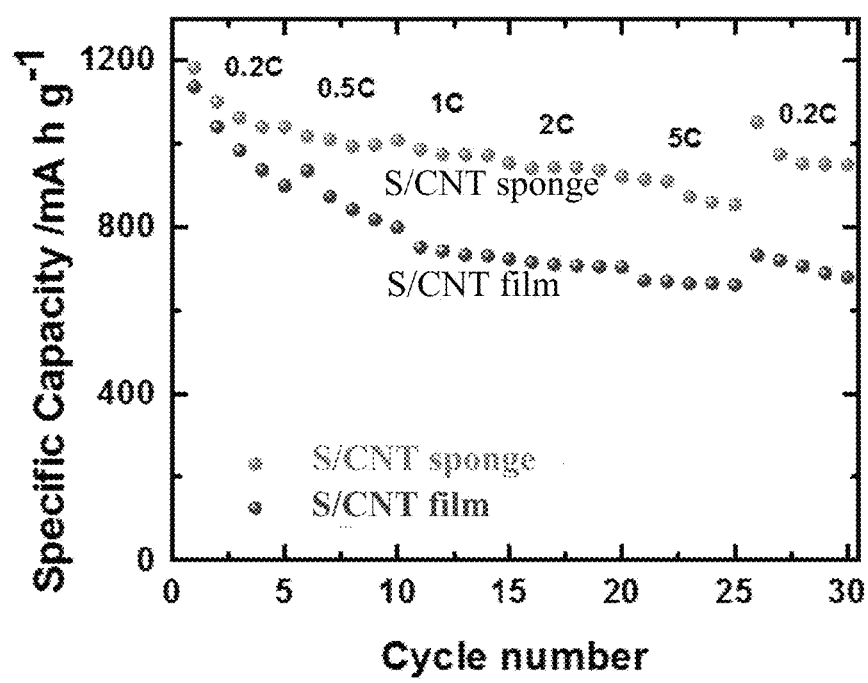
FIG. 16 is a diagram of rate tests of the S/CNT sponge cathode and the S/CNT film cathode at a constant discharge rate of 0.2 C.
Figure 17:
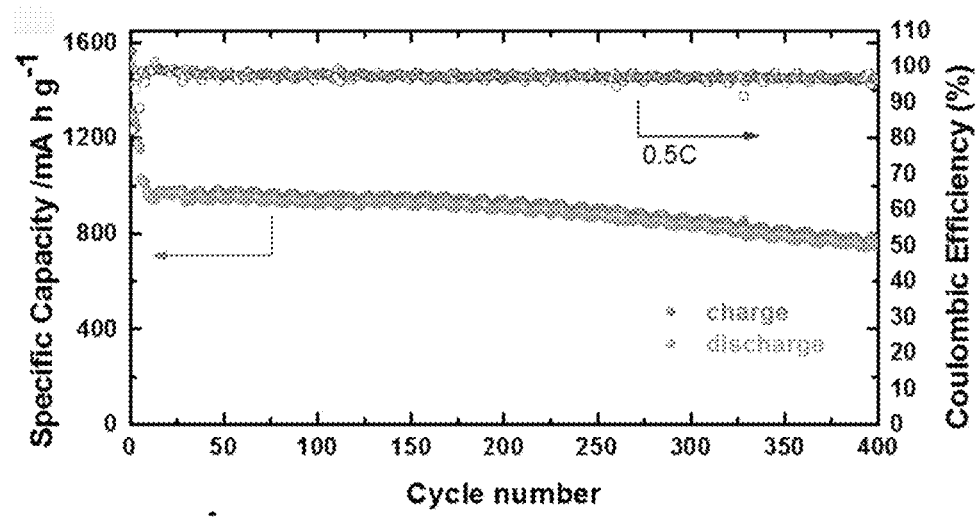
FIG. 17 is a diagram of long cycle performance tests of the S/CNT sponge cathode at a charge/discharge current of 0.5 C.
Figure 18:
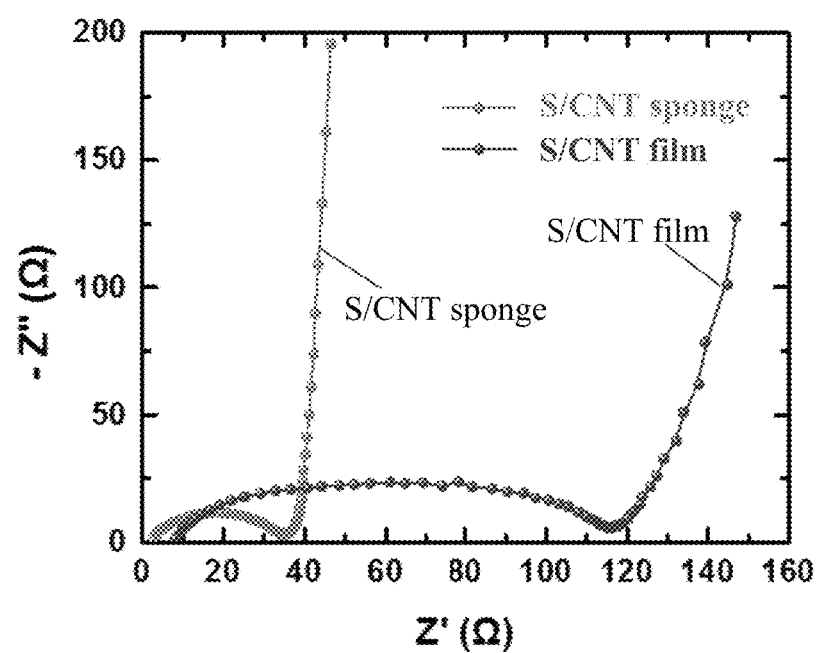
FIG. 18 is a diagram of Electrochemical Impedance Spectroscopy (EIS) of the S/CNT sponge cathode and the S/CNT film cathode.

A rate performance test and a long cycle stability test are shown in FIG. 16~FIG. 18. Referring to FIG. 16, the S/CNT sponge electrode delivers a high reversible discharge capacity of 1017, 986, 940 and 914 mAhg$^{-1}$ at stepwise charge rates of 0.5, 1, 2 and 5 C, respectively. When the charge rate is returned at 0.5 C, the discharge capacity of the electrode can be restored to 1051 mA h g$^{-1}$ with no apparent decline, presenting a great reversibility of the electrode. The S/CNT film electrode delivers the discharge capacity of 935, 750, 716 and 672 mAhg$^{-1}$ at stepwise charge rates of 0.5, 1, 2 and 5 C, respectively. However, when the charge rate is reduced to 0.5 C, the capacity of the S/CNT film electrode can only return to 732 mA h g$^{-1}$, 64% of the original capacity at 0.2 C, indicating the severe loss of active material during the cycling process. Compared to the S/CNT film electrode, the S/CNT sponge electrode exhibits superior rate performance. The CNT sponge structure forms a 3D current collector making sure that the uniformly distributed sulfur nanoparticles in the micropores maintain close contact with carbon nanotube bundles. Therefore the electron diffusion length is shortened, charge accumulation is eliminated and polarization is prohibited when charged at high rates. Besides, the sufficient active reaction sites of the CNT sponge provide an interface for the deposition and further reversible reaction of the discharge product Li$_2$S. The superior adsorption ability of CNT sponge further restricts the dissolution and diffusion of polysulfides. All these contribute to the improved rate performances of the S/CNT sponge electrode.

Referring to FIG. 17, the initial specific capacity of the S/CNT sponge electrode can reach 1031 mA h g$^{-1}$. A capacity fading rate is 0.068% per cycle. It has been reported that sulfur electrodes often suffer a low Coulombic efficiency less than 90% ascribed to the serious shuttle effect. However, the Coulombic efficiency of the S/CNT sponge electrode is remarkable 97.2% at 400$^{th}$ cycle. This indicates that the S/CNT sponge electrode is a efficient reservoir of polysulfide. For the S/CNT sponge electrode, the hierarchical pore structure, excellent conductivity and adsorption capability contribute to the extraordinary long cycle stability and high Coulombic efficiency.

In the S/CNT film, the sulfur nanoparticles are coated on the surface of the CNTs, thus the ohmic resistance of the S/CNT film electrode is increased. However, in the S/CNT sponge, the sulfur nanoparticles are distributed in the micopores and maintain good contact with carbon nanotubes. Moreover, the interconnected conductive network built up by carbon nanotubes can give rise to the conductivity of the S/CNT sponge electrode. Therefore, as shown in FIG. 18, the ohmic internal resistance of the S/CNT sponge electrode (2.51Ω) is smaller than that of the S/CNT film electrode (8.03Ω). A charge transfer resistance of the S/CNT sponge electrode (35.05Ω) is also smaller than that of the S/CNT film electrode (115.67Ω). The charge transfer resistance here can be understood as the resistance resulting from interfacial charge transportation between the sulfur active materials and the electrolyte. In the S/CNT sponge electrode, the electrolyte can penetrate into the CNT sponge through the micropores, and the hierarchical pore structure of the CNT sponge can also promote charge transformation and redistribution. In contrast, the S/CNT film lacks sufficient pores and is densely distributed in the thickness direction, so its charge transfer resistance is larger.

Figure 19:
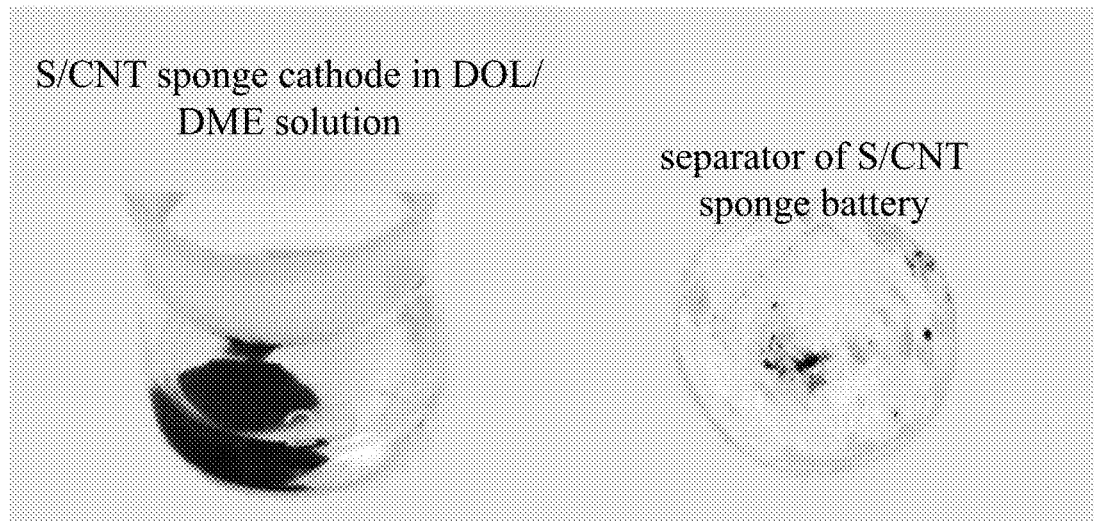
FIG. 19 is a photograph of the S/CNT sponge cathode immersed in DOL/DME solution and the S/CNT sponge battery's separator disassembled when discharged at 2.09 V.
Figure 20:
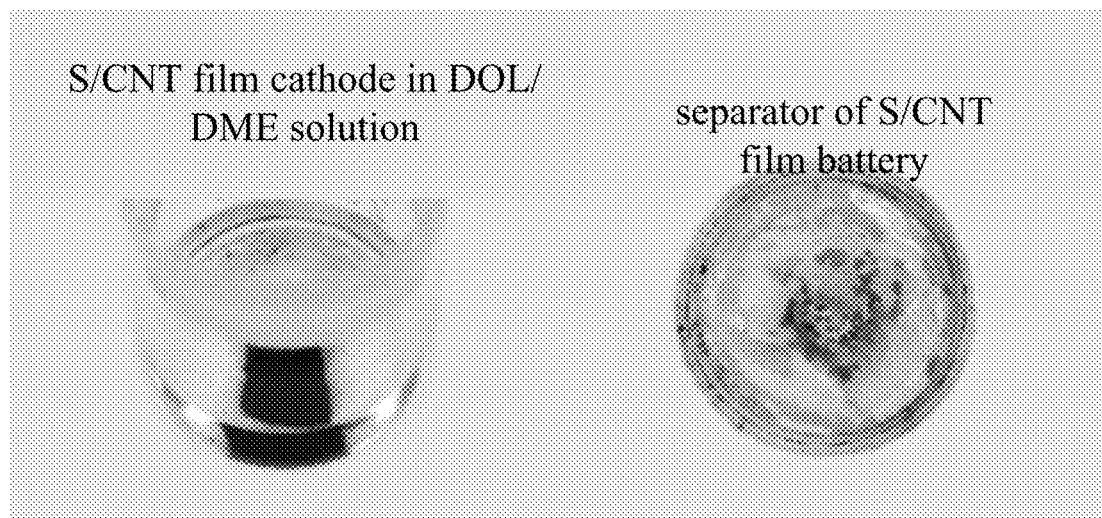
FIG. 20 is a photograph of the S/CNT film cathode in DOL/DME solution and the S/CNT film battery's separator disassembled when discharged at 2.09 V. (Prior art)

A morphology comparison between the S/CNT sponge electrode and the S/CNT film electrode after discharge is shown as FIG. 19~FIG. 24. In one embodiment, a discharge voltage of the lithium-sulfur battery is set to 2.09V. Then, after discharged at 2.09 V, the Li—S battery is detached. The S/CNT sponge electrode and the S/CNT film electrode are soaked in a mixed solution of dioxolane (DOL) and dimethoxyethane (DME). Referring to FIG. 19, the solution containing the S/CNT sponge electrode becomes yellow after a minute and there are nearly no dark yellow polysulfides on a surface of the separator. The results firmly prove the outstanding performance of CNT sponge as a polysulfide reservoir. The sulfur active material and polysulfide are mostly confined in the micropores of the CNT sponge. Compared to the S/CNT sponge electrode, it is completely opposite for the S/CNT film electrode. Referring to FIG. 20, the solution containing the S/CNT film cathode is almost clear and a lot of dark yellow polysulfides are observed on the surface of the separator. The S/CNT film can barely restrict the polysulfides in the cathode, thus the polysulfides is dispersed on the surface of the separator, and further inevitably diffuse to the lithium foil.

Figure 21:
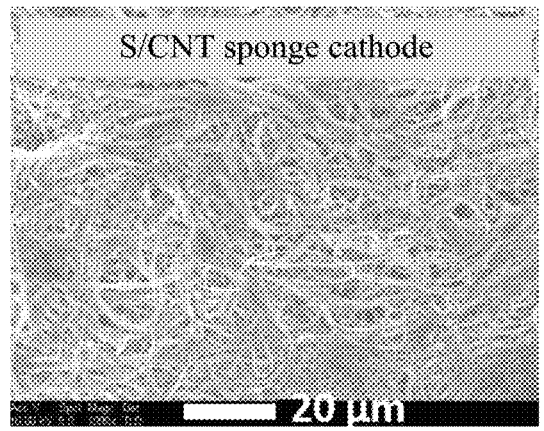
FIG. 21 is a SEM image of the S/CNT sponge cathode after multiple cycles.
Figure 22:
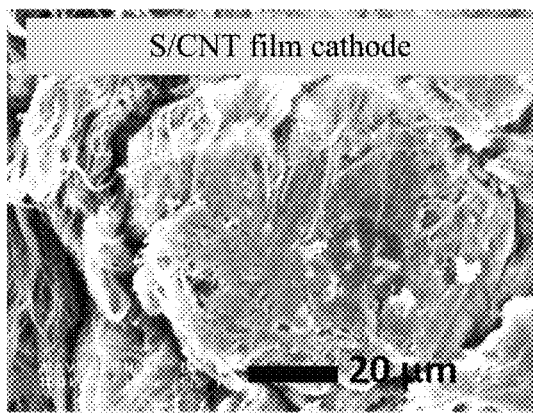
FIG. 22 is a SEM image of the S/CNT film cathode after multiple cycles. (Prior art)

A surface morphology of the S/CNT sponge electrode and the S/CNT film electrode after 150 cycles at 0.2 C are shown as FIG. 21 and FIG. 22 respectively, wherein, the surface is the side facing the separator. Referring to FIG. 21, the porous feature of the CNT sponge maintains well after repeated discharge/charge cycles and there is no large particle aggregating on the surface of the S/CNT sponge electrode. On the contrary, referring to FIG. 22, severe carbon nanotube agglomeration and large particle deposition happen on the surface of the S/CNT film electrode, due to the dissolution and diffusion of a large amount of polysulfides.

Figure 23A:
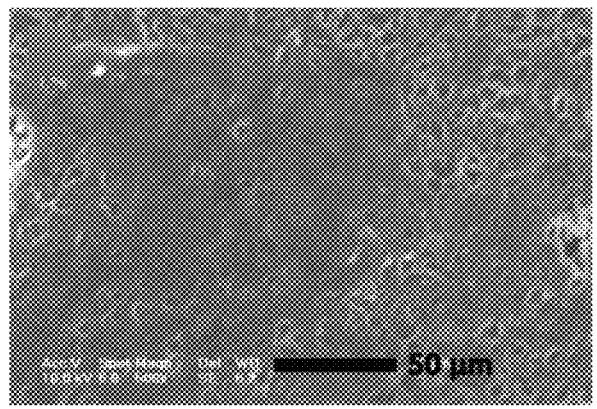
FIG. 23a is a SEM image of a surface of a lithium foil of the S/CNT sponge battery after multiple cycles.
Figure 23B:
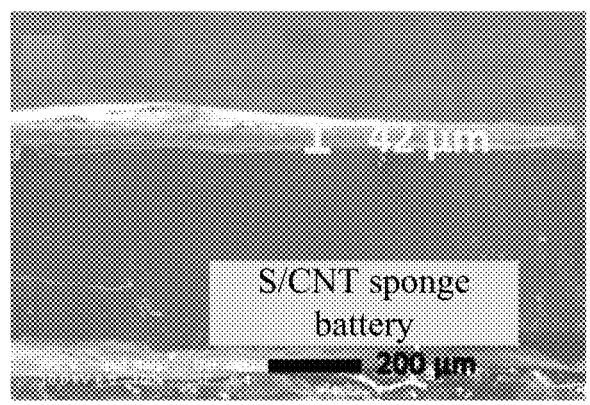
FIG. 23b is a cross-sectional SEM image of the lithium foil of the S/CNT sponge battery after multiple cycles.
Figure 24A:
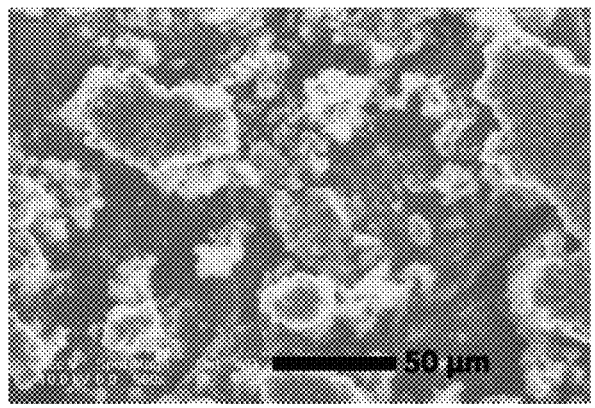
FIG. 24a is a SEM image of a surface of the lithium foil of the S/CNT film battery after multiple cycles. (Prior art)
Figure 24B:
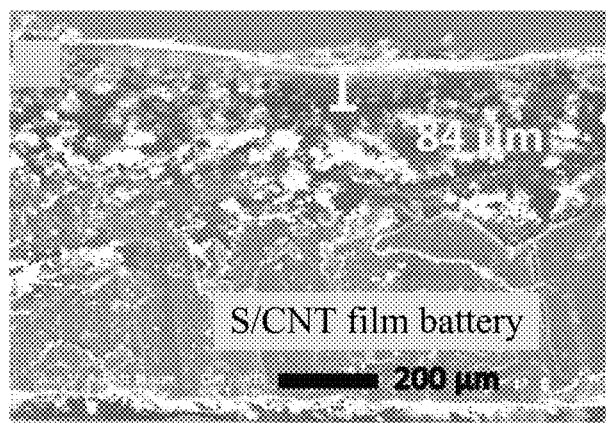
FIG. 24b is a cross-sectional SEM image of the lithium foil of the S/CNT film battery after multiple cycles. (Prior art)

The morphology of lithium foil after repeated cycles is further investigated to exhibit the extraordinary polysulfides adsorption ability of the CNT sponge as polysulfides reservoirs. Referring to FIG. 23a, in the S/CNT sponge battery, the lithium foil after multiple cycles comprises a relatively smooth surface and no obvious corrosion is observed. In contrast, in the S/CNT film battery, the cycled lithium anode comprises a rather tough surface with moss-like reaction products, as shown in FIG. 24a. According to the cross-sectional SEM images in FIG. 24a and FIG. 24b, a thickness of a passivation layer formed on the surface of the cycled lithium anodes in the S/CNT sponge battery and the S/CNT film battery is 42 and 84 µm, respectively. The passivation layer is composed of reaction products from electrolyte and lithium polysulfides. During the discharge/charge process, due to fast dissolution/deposition of polysulfides on the passivation layer cracks repeatedly. Therefore, the corrosion and roughness on the surface of the Li anode aggravate. The thicker the passivation layer is, the lower the reactivity of the lithium anode is. The passivation layer can also increase the inner resistance and decrease an electrochemical performance of the Li—S battery. All these mentioned above indicates that the performance of S/CNT thin film battery is worse than that of S/CNT sponge battery. Comparatively, in the S/CNT sponge battery, the three-dimensional interconnected network, hierarchical porous structure, and extraordinary adsorption capacity facilitate the restriction of polysulfides dissolution and diffusion. As a consequence, the Li anode of the S/CNT sponge battery has a smooth surface and thin passivation layer even if the sulfur loading of the S/CNT sponge is higher than that of the S/CNT film.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A lithium-sulfur battery cathode, consisting of:
   a carbon nanotube sponge having elasticity and consisting of a carbon layer and a plurality of carbon nanotubes, wherein a plurality of micropores are distributed between adjacent ones of the plurality of carbon nanotubes, a length of the plurality of carbon nanotubes is longer than 300 micrometers, and a specific surface area of the carbon nanotube sponge is larger than 200 $m^2 \cdot g^{-1}$; and
   a plurality of sulfur nanoparticles distributed in the plurality of micropores, wherein an area density of the plurality of sulfur nanoparticles is greater than or equal to 2 $mg \cdot cm^{-2}$, and the plurality of carbon nanotubes are entangled with each other.

2. The lithium-sulfur battery cathode of claim 1, wherein a diameter of each of the plurality of micropores is greater than or equal to 2 nm.

3. The lithium-sulfur battery cathode of claim 1, wherein a diameter of each of the plurality of sulfur nanoparticles is less than or equal to 50 nm.

4. The lithium-sulfur battery cathode of claim 1, wherein a mass content of the plurality of sulfur nanoparticles ranges from approximately 40% to approximately 60%.

5. The lithium-sulfur battery cathode of claim 1, wherein a mass ratio between the carbon layer and the plurality of carbon nanotubes ranges from approximately 0.01:1 to approximately 8:1.

6. The lithium-sulfur battery cathode of claim 1, wherein a thickness of the carbon layer ranges from approximately 2 nm to approximately 100 nm.

7. The lithium-sulfur battery cathode of claim 1, wherein the carbon layer is continuous at junctions between the plurality of carbon nanotubes, and the plurality of carbon nanotubes are affixed together at the junctions by the carbon layer.

8. The lithium-sulfur battery cathode of claim 1, wherein the lithium-sulfur battery cathode is a honeycomb structure comprising the plurality of micropores.

9. The lithium-sulfur battery cathode of claim 1, wherein the carbon layer is between the plurality of sulfur nanoparticles and the plurality of carbon nanotubes.

10. The lithium-sulfur battery cathode of claim 1, wherein the lithium-sulfur battery cathode is formed by dripping a sulfur dispersion comprising sulfur particles and a solvent on a surface of the carbon nanotube sponge, so that the sulfur dispersion drips into micropores of the carbon nanotube sponge; then heating the carbon nanotube sponge and the sulfur dispersion in the carbon nanotube sponge, thereby reducing sizes of the sulfur particles, so that the sulfur dispersion is distributed in the carbon nanotube sponge; and heating the carbon nanoatube sponge with the sulfur dispersion therein further comprises heating until the sulfur particles in the carbon nanotube sponge are melt, and cooling after the heating until sizes of the sulfur nanoparticles become smaller than pore sizes of the micropores of the carbon nanotube sponge is further performed.

11. A lithium-sulfur battery cathode, consisting of:
 a carbon nanotube sponge having elasticity and consisting of a carbon layer and a plurality of carbon nanotubes entangled with each other, wherein a length of the plurality of carbon nanotubes is longer than 300 micrometers, a mass ratio between the carbon layer and the plurality of carbon nanotubes ranges from approximately 0.01:1 to approximately 8:1, a plurality of micropores are distributed between adjacent ones of the plurality of carbon nanotubes, and a diameter of each of the plurality of micropores is greater than or equal to 2 nm; and
 a plurality of sulfur nanoparticles distributed in the plurality of micropores, wherein a diameter of each of the plurality of sulfur nanoparticles is less than or equal to 50 nm.

12. The lithium-sulfur battery cathode of claim 11, wherein an area density of the plurality of sulfur nanoparticles is greater than or equal to 2 $mg \cdot cm^{-2}$.

13. The lithium-sulfur battery cathode of claim 11, wherein a specific surface area of the carbon nanotube sponge is larger than 200 $m^2 \cdot g^{-1}$.

14. The lithium-sulfur battery cathode of claim 11, wherein a thickness of the carbon layer ranges from approximately 2 nm to approximately 100 nm.

* * * * *